(12) United States Patent
Liu et al.

(10) Patent No.: US 12,481,520 B2
(45) Date of Patent: Nov. 25, 2025

(54) DYNAMIC CONTROL OF eBPF PROGRAM EXECUTION IN AN OPERATING SYSTEM KERNEL

(71) Applicant: International Business Machines Corporation, Armonk, NY (US)

(72) Inventors: Xiaojing Liu, Beijing (CN); Qi Feng Huo, Beijing (CN); Qi Li, Beijing (CN); Yong Quan Tian, Beijing (CN); Xiao Ling Chen, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 518 days.

(21) Appl. No.: 18/185,463

(22) Filed: Mar. 17, 2023

(65) Prior Publication Data
US 2024/0311172 A1    Sep. 19, 2024

(51) Int. Cl.
*H04L 9/40* (2022.01)
*G06F 9/455* (2018.01)

(52) U.S. Cl.
CPC ...... *G06F 9/45558* (2013.01); *H04L 63/0227* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 2019/0140983 A1* | 5/2019 | Tu | H04L 69/22 |
| 2019/0173841 A1* | 6/2019 | Wang | G06F 9/5083 |
| 2019/0324882 A1* | 10/2019 | Borello | G06F 9/5077 |
| 2019/0347406 A1* | 11/2019 | Lev-Ran | G06F 21/51 |
| 2021/0012011 A1* | 1/2021 | Huang | G06F 21/79 |
| 2022/0337682 A1 | 10/2022 | Waskiewicz, Jr. et al. | |
| 2023/0388393 A1* | 11/2023 | Foukas | G06F 9/45558 |
| 2024/0086558 A1* | 3/2024 | Jadhav | G06F 21/6218 |
| 2024/0106846 A1* | 3/2024 | Kapoor | H04L 63/10 |
| 2024/0202097 A1* | 6/2024 | Kelly | G06F 21/566 |
| 2024/0202134 A1* | 6/2024 | Kelly | G06F 12/1009 |
| 2024/0303171 A1* | 9/2024 | Larkin | G06F 9/545 |

FOREIGN PATENT DOCUMENTS

| | | |
|---|---|---|
| CN | 113986459 A | 1/2022 |
| CN | 114816761 A | 7/2022 |
| EP | 3241312 A1 | 11/2017 |

* cited by examiner

*Primary Examiner* — Kenneth Tang
(74) *Attorney, Agent, or Firm* — Yee & Associates, P.C.

(57) ABSTRACT

Managing execution of eBPF program capabilities is provided. A comparison of a currently in use helper-id list with an allowable helper-id list of an eBPF program is performed. It is determined whether a set of unallowable helper-ids exists that is included in the currently in use helper-id list but not in the allowable helper-id list based on the comparison. A blocked helper-id list of the eBPF program that includes the set of unallowable helper-ids and a corresponding unallowable capability of each respective unallowable helper-id is generated in response to determining that the set of unallowable helper-ids does exist. The set of unallowable helper-ids and the corresponding unallowable capability of each respective unallowable helper-id is removed from bytecode of the eBPF program in order to have only allowable helper-ids remain in the bytecode along with corresponding allowable capabilities of the eBPF program.

20 Claims, 9 Drawing Sheets

```
EXISTING eBPF PROGRAM BYTECODE: ⟵304
• struct bpf_insn {
       __u8   code;         // Opcode
       __u8   dst_reg:4;    // Target register
       __u8   src_reg:4;    // Source registers
       __s16  off;          // Offset
       __s32  imm;          // number of immediate operations};

ENHANCED eBPF PROGRAM BYTECODE: ⟵300
             • struct bpf_insn {
                    __u8   code;         // Opcode
                    __u8   dst_reg:4;    // Target register
                    __u8   src_reg:4;    // Source registers
                    __s16  off;          // Offset
                    __s32  imm;          // number of immediate operations
                    __u8   bpf_helper_id //"bpf enhance")
             };
                           302
```

FIG. 3

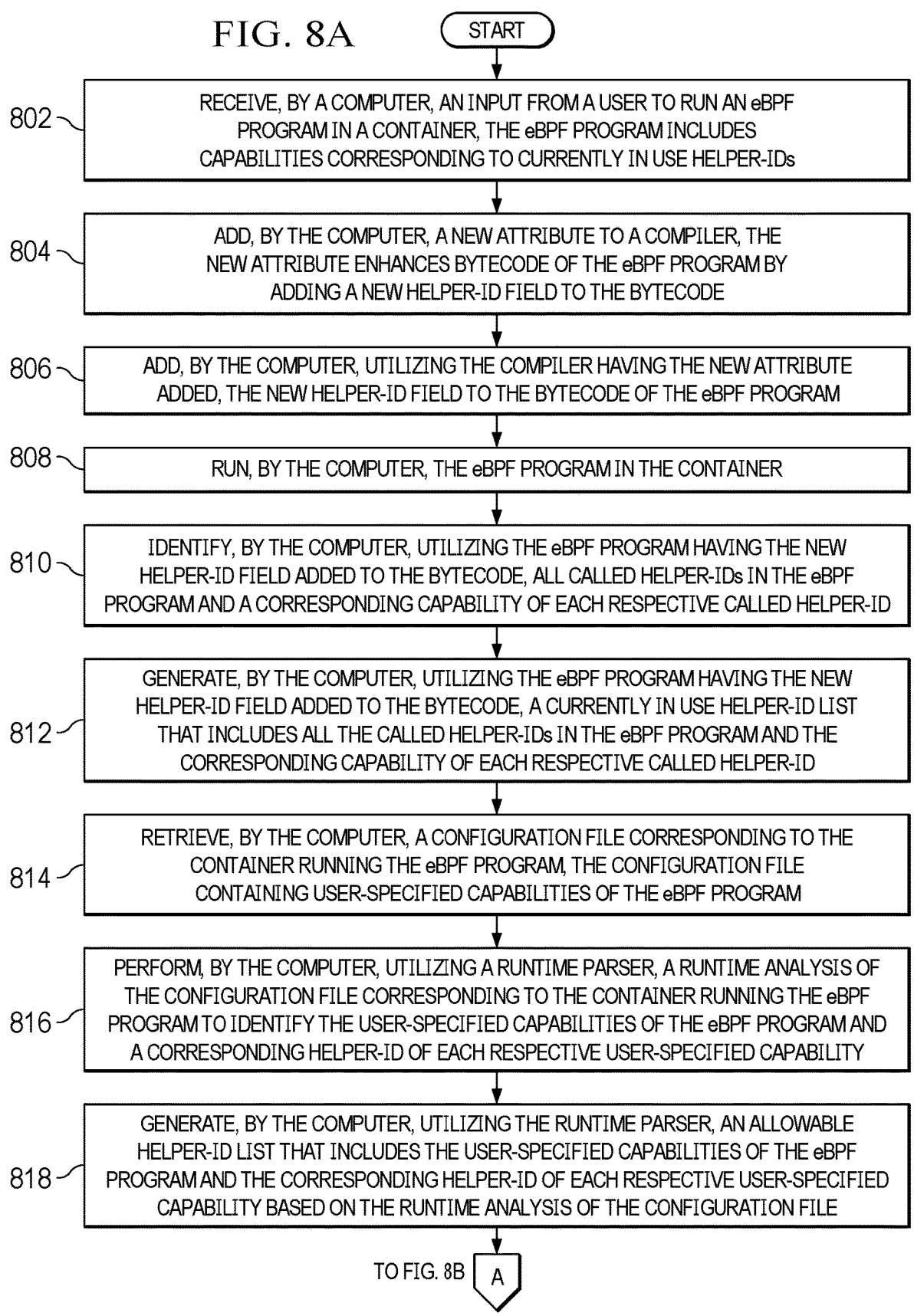

DYNAMIC CONTROL OF eBPF PROGRAM EXECUTION IN AN OPERATING SYSTEM KERNEL

BACKGROUND

The disclosure relates generally to operating systems and more specifically to selectively controlling execution permissions of eBPF program capabilities in an operating system kernel to increase system security.

Historically, operating systems have been an ideal place to implement observability, security, networking functionality, and the like due to the kernel's privileged ability to oversee and control the entire system. However, an operating system kernel is hard to change due to its central role and requirement towards stability and security. Thus, the rate of change at the operating system level has traditionally been lower compared to functionality implemented in programs and applications outside of the operating system.

An extended Berkeley Packet Filter ("eBPF") is technology that can run sandboxed programs in an operating system kernel. eBPF is used to extend the capabilities of the kernel without needing to change kernel source code or load new kernel modules. By allowing an eBPF program to run sandboxed programs within the operating system kernel, program developers can run the eBPF program to add new capabilities to the operating system at runtime. The operating system then executes these added new capabilities as if natively compiled with the aid of a Just-In-Time (JIT) compiler and verifier. The eBPF program can be used to, for example, provide high-performance networking and load-balancing in data centers and cloud environments, extract fine-grained security observability data at low overhead, help program developers trace applications, provide insights for performance troubleshooting, prevent application and container runtime security enforcement, and the like.

SUMMARY

According to one illustrative embodiment, a computer-implemented method for managing execution of eBPF program capabilities is provided. A computer performs a comparison of a currently in use helper-id list of an eBPF program with an allowable helper-id list of the eBPF program. The computer determines whether a set of unallowable helper-ids of the eBPF program exists that is included in the currently in use helper-id list of the eBPF program but not included in the allowable helper-id list of the eBPF program based on the comparison. The computer generates a blocked helper-id list of the eBPF program that includes the set of unallowable helper-ids of the eBPF program and a corresponding unallowable capability of each respective unallowable helper-id in response to the computer determining that the set of unallowable helper-ids of the eBPF program does exist. The computer removes the set of unallowable helper-ids and the corresponding unallowable capability of each respective unallowable helper-id from bytecode of the eBPF program in order to have only allowable helper-ids remain in the bytecode along with corresponding allowable capabilities of the eBPF program. According to other illustrative embodiments, a computer system and computer program product for managing execution of eBPF program capabilities are provided.

BRIEF DESCRIPTION OF THE DRAWINGS

FIG. 3 is a diagram illustrating an example of enhanced eBPF program bytecode in accordance with an illustrative embodiment;

FIGS. 8A-8B are a flowchart illustrating a process for selectively managing execution permissions of eBPF program capabilities in accordance with an illustrative embodiment.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc), or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
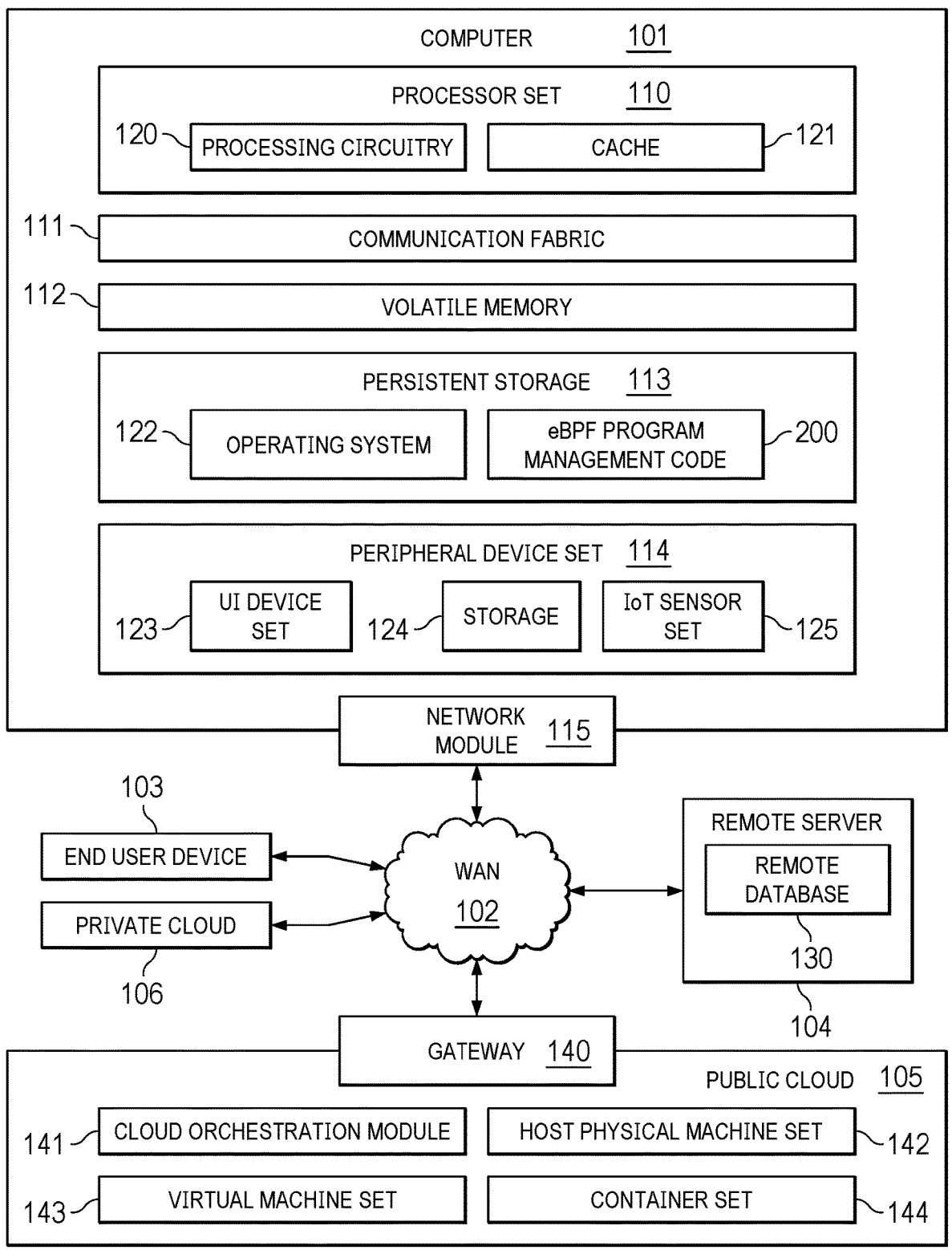
FIG. 1 is a pictorial representation of a computing environment in which illustrative embodiments may be implemented.
Figure 2:
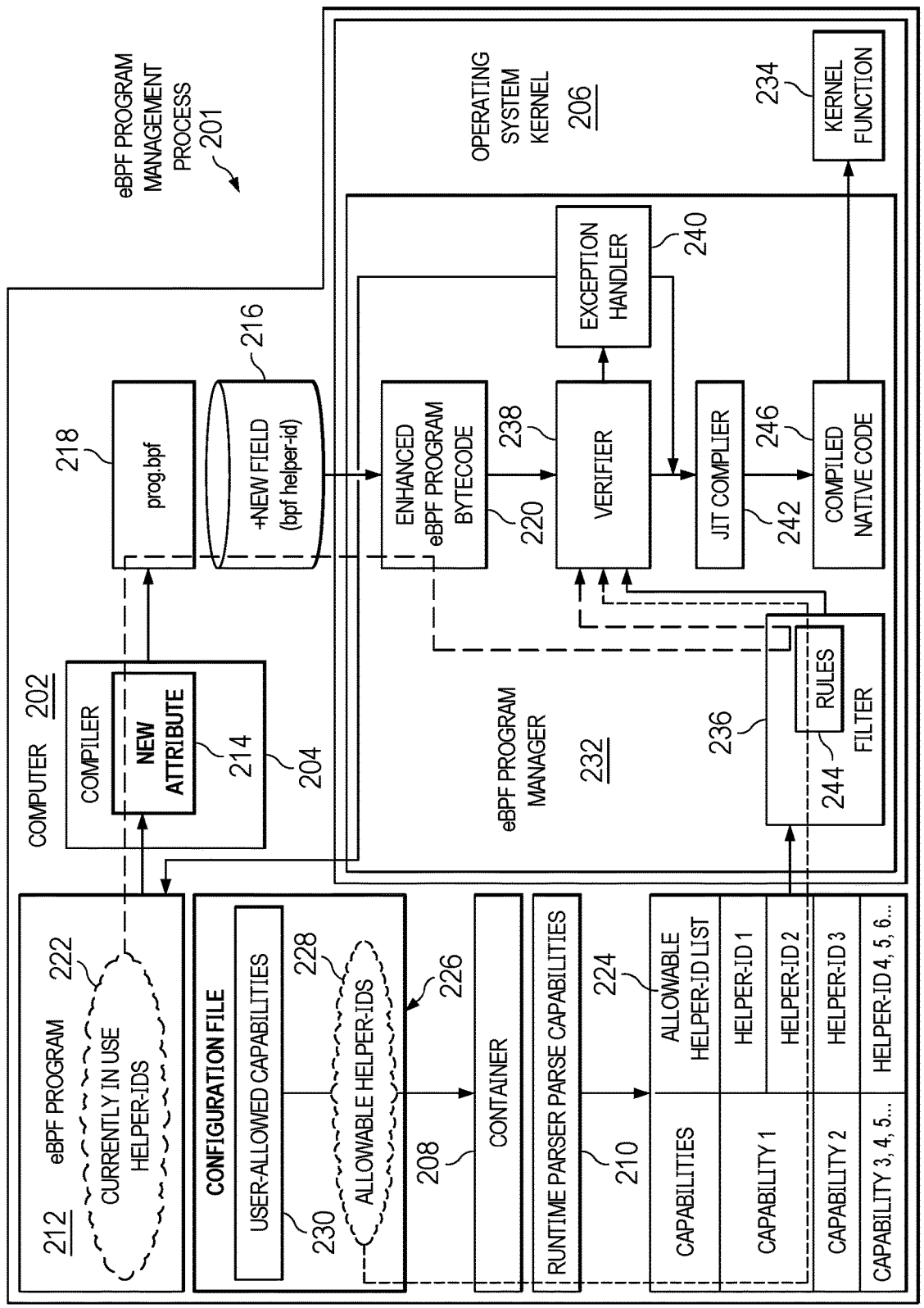
FIG. 2 is a diagram illustrating an example of an eBPF program management process in accordance with an illustrative embodiment.

With reference now to the figures, and in particular, with reference to FIGS. 1-2, diagrams of data processing environments are provided in which illustrative embodiments may be implemented. It should be appreciated that FIGS. 1-2 are only meant as examples and are not intended to assert or imply any limitation with regard to the environments in which different embodiments may be implemented. Many modifications to the depicted environments may be made.

FIG. 1 shows a pictorial representation of a computing environment in which illustrative embodiments may be implemented. Computing environment 100 contains an example of an environment for the execution of at least some of the computer code involved in performing the inventive methods, such as eBPF program management code 200. For example, eBPF program management code 200 enhances performance of the compiler and verifier at the eBPF program load phase. eBPF program management code 200 performs an execution permission verification check of capabilities corresponding to helper-identifiers ("helper-ids") in the eBPF program by comparing a list of currently in use helper-ids in the eBPF program with a list of allowable helper-ids specified by a user, such as, for example, a system administrator, program developer, program owner, or the like, in a configuration file of a container running the eBPF program. If the execution permission verification check fails, then eBPF program management code 200 prevents the operating system kernel from executing operations corresponding to capabilities associated with helper-ids in the eBPF program not found in the list of allowable helper-ids, thereby increasing system security.

In addition to eBPF program management code 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and eBPF program management code 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer, or any other form of computer or mobile device now known or to be developed in the future that is capable of, for example, running a program, accessing a network, and querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in eBPF program management code 200 in persistent storage 113.

Communication fabric 111 is the signal conduction path that allows the various components of computer 101 to communicate with each other. Typically, this fabric is made of switches and electrically conductive paths, such as the switches and electrically conductive paths that make up buses, bridges, physical input/output ports, and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data, and re-writing of data. Some familiar forms of persistent storage include magnetic disks and solid-state storage devices. Operating system 122 may take several forms, such as various known proprietary operating systems or opensource Portable Operating System Interface-type operating systems that employ a kernel. The eBPF program management code included in block 200 includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks, and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

EUD 103 is any computer system that is used and controlled by an end user (for example, a system administrator that operates computer 101), and may take any of the forms discussed above in connection with computer 101. EUD 103 typically receives helpful and useful data from the operations of computer 101. For example, in a hypothetical case where computer 101 is designed to provide a recommendation for modifying an eBPF program to the end user, this recommendation would typically be communicated from network module 115 of computer 101 through WAN 102 to EUD 103. In this way, EUD 103 can display, or otherwise present, the recommendation for modifying the eBPF program to the end user. In some embodiments, EUD 103 may be a client device, such as thin client, heavy client, mainframe computer, desktop computer, laptop computer, tablet computer, smart phone, and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation for modifying an eBPF program based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single entity. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

As used herein, when used with reference to items, "a set of" means one or more of the items. For example, a set of clouds is one or more different types of cloud environments. Similarly, "a number of," when used with reference to items, means one or more of the items. Moreover, "a group of" or "a plurality of" when used with reference to items, means two or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Recently, eBPF programs have gained a lot of attention in both the operating system and cloud native application worlds. Basically, an eBPF program allows a user to run an application in the operating system kernel without kernel code change or loading a new kernel module, which results in an increase in overall system performance. Current verifiers only go over the potential paths an eBPF program can take when executed in the kernel to ensure that the eBPF program runs to completion without any looping. Looping can result in kernel lockup. Consequently, a need exists to manage and control eBPF program execution at a high level of granularity.

Illustrative embodiments provide dynamic, high-level granular control of execution permissions of additional capabilities provided to the operating system kernel by the eBPF program to increase system security. The eBPF program may be running in, for example, a container of host node within a container orchestration environment such as Kubernetes® (a registered trademark of the Linux Foundation of San Francisco, California), which provides a platform for automating deployment, scaling, and operations of containers across clusters of host nodes. A host node is a machine, either physical or virtual, where containers (i.e., application workloads) are deployed.

Illustrative embodiments enhance the compiler (e.g., clang compiler) by adding a new attribute (i.e., "bpf_helper_id") to the compiler. This new attribute of the compiler enhances the bytecode of the eBPF program by adding a new field to the bytecode structure of the eBPF program. The new field in the bytecode structure of the eBPF program identifies all currently in use (i.e., called) helper-ids and their corresponding capabilities (e.g., operations performed by the eBPF program in the kernel of the operating system) to generate a currently in use helper-id list of the eBPF program.

In addition, illustrative embodiments utilize a runtime parser to generate an allowable helper-id list of the eBPF program by performing a runtime analysis of a configuration file, such as, for example, a JSON configuration file, YAML configuration file, or the like, in which a user, such as, for example, a system administrator, program developer, or the like, specifies the allowable helper-ids corresponding to user-allowed capabilities of the eBPF program to increase security of the eBPF program. Illustrative embodiments utilize a filter to enhance the verifier with a set of helper-id comparison rules. The verifier utilizes the set of helper-id comparison rules to compare the currently in use helper-id list of the eBPF program with the allowable helper-id list of the eBPF program. Illustrative embodiments prevent execution of any eBPF program capabilities corresponding to any helper-ids found in the currently in use helper-id list but not found in the allowable helper-id list.

Thus, illustrative embodiments provide one or more technical solutions that overcome a technical problem with uncontrolled execution of eBPF program capabilities, which decreases security, in an operating system kernel. As a result, these one or more technical solutions provide a technical effect and practical application in the field of operating systems.

With reference now to FIG. 2, a diagram illustrating an example of an eBPF program management process is depicted in accordance with an illustrative embodiment. eBPF program management process 201 is implemented in computer 202, such as, for example, computer 101 in FIG. 1. eBPF program management process 201 includes hardware and software components for selectively controlling execution permissions of eBPF program capabilities, which increases security, in an operating system kernel.

In this example, computer 202 includes compiler 204, operating system kernel 206, container 208, and runtime parser 210. Computer 202 utilizes container 208 to run eBPF program 212. Computer 202 utilizes new "bpf_helper_id" attribute 214 in compiler 204 to add new "bpf_helper_id" field 216 in bytecode 218 of eBPF program 212 to form enhanced eBPF program bytecode 220. Computer 202 utilizes new "bpf_helper_id" field 216 of enhanced eBPF program bytecode 220 to identify currently in use helper-ids 222 in eBPF program 212 and generate a currently in use helper-id list of eBPF program 212.

Computer 202 utilizes runtime parser 210 to generate allowable helper-id list 224 of eBPF program 212 based on a runtime analysis of configuration file 226, which corresponds to container 208. Configuration file 226 may be, for example, a JSON configuration file. Configuration file 226 includes allowable helper-ids 228 and corresponding user-allowed capabilities 230, which are specified by the user. In other words, runtime parser 210 translates allowable helper-ids 228 and corresponding user-allowed capabilities 230 contained in configuration file 226 into allowable helper-id list 224 of eBPF program 212. It should be noted that a single capability can map to multiple helper-ids.

Operating system kernel 206 includes eBPF program manager 232 and kernel function 234. eBPF program manager 232 may be implemented in, for example, eBPF program management code 200 in FIG. 1. In this example, eBPF program manager 232 includes filter 236, verifier 238, exception handler 240, and JIT compiler 242.

eBPF program manager 232 utilizes filter 236 to provide helper-id comparison rules 244 to verifier 238 for comparing the currently in use helper-id list of eBPF program 212 with allowable helper-id list 224 of eBPF program 212 to increase security of eBPF program 212. Based on the comparison, verifier 238 generates a blocked helper-id list (i.e., those helper-ids found in the currently in use helper-id list but are not found in allowable helper-id list 224).

eBPF program manager 232 utilizes exception handler 240 to send an alert, which contains the blocked helper-id list, to the user recommending that the user modify eBPF program 212 by removing those helper-ids included in the blocked helper-id list, along with their corresponding capabilities, from eBPF program 212. Alternatively, in addition to sending the alert, exception handler 240 automatically removes those helper-ids included in the blocked helper-id list, along with their corresponding capabilities, from eBPF program 212. Further, exception handler 240 rejects those eBPF program capabilities corresponding to any blocked helper-id as an unallowable or invalid eBPF program capability. In other words, exception handler 240 prevents those operations of unallowable or invalid capabilities corresponding to blocked helper-ids from executing in operating system kernel 206, thus increasing overall system security.

As a result, JIT compiler 242 generates compiled native code 246, which is specific to the operating system of computer 202, containing only allowable helper-ids 228 and their corresponding user-allowed capabilities 230. eBPF program manager 232 passes compiled native code 246 to kernel function 234 for execution of operations corresponding to user-allowed capabilities 230.

With reference now to FIG. 3, a diagram illustrating an example of enhanced eBPF program bytecode in accordance with an illustrative embodiment. Enhanced eBPF program bytecode 300 is implemented in an operating system kernel of a computer, such as operating system kernel 206 of computer 202, and may be, for example, enhanced eBPF program bytecode 220 in FIG. 2. Enhanced eBPF program bytecode 300 contains new bpf_helper_id field 302, such as, for example, new bpf_helper_id field 216 in FIG. 2. Existing eBPF program bytecode 304 shows the structure of the bytecode of the eBPF program, such as, for example, bytecode 218 of eBPF program 212 in FIG. 2, prior to enhancement by a new attribute of a compiler, such as, for example, new bpf_helper_id attribute 214 of compiler 204 in FIG. 2. The new attribute triggers the compiler to generate new bpf_helper_id field 302 in the eBPF.

Figure 4:
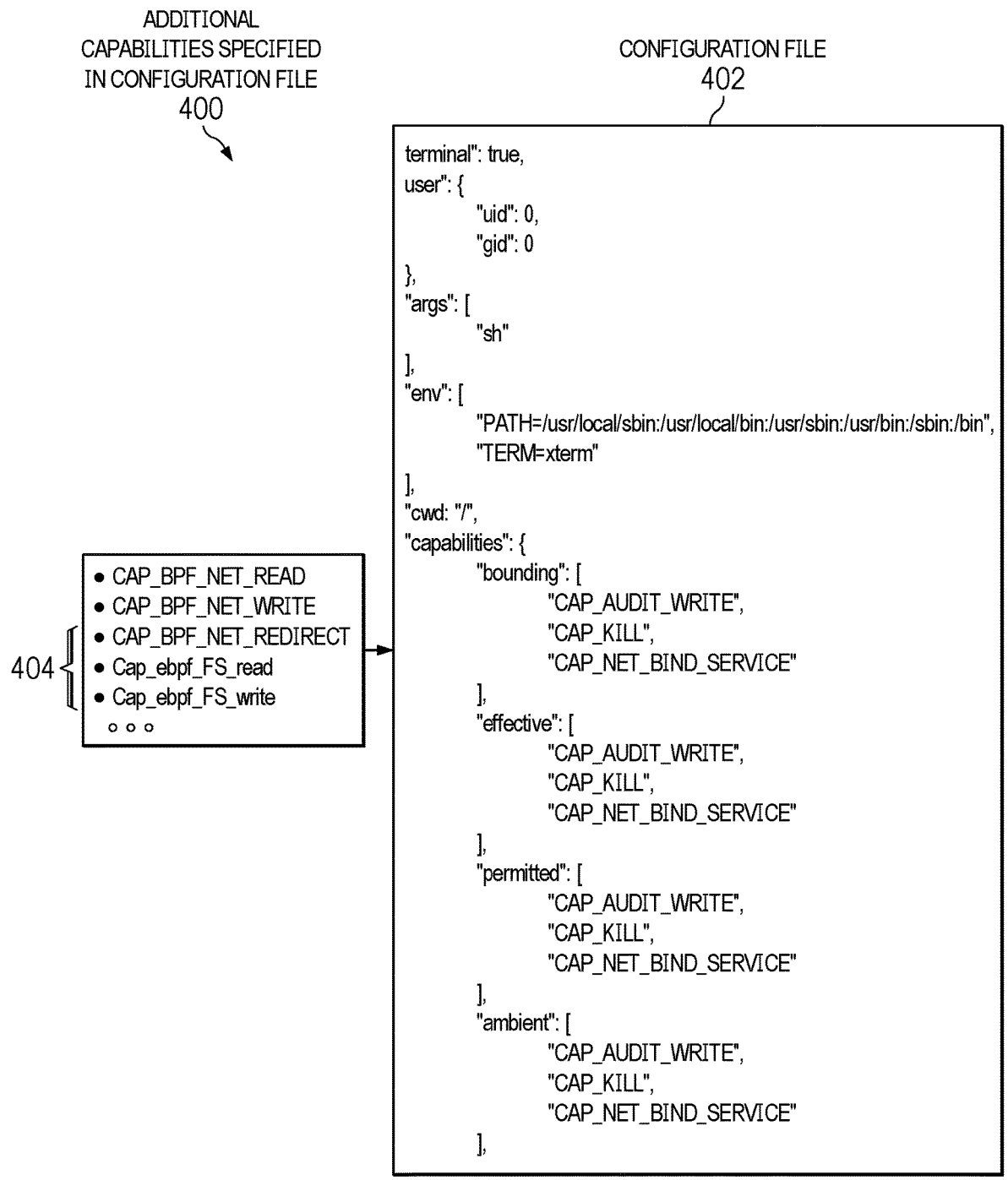
FIG. 4 is a diagram illustrating an example of additional capabilities specified in a configuration file in accordance with an illustrative embodiment.

With reference now to FIG. 4, a diagram illustrating an example of additional capabilities specified in a configuration file is depicted in accordance with an illustrative embodiment. Additional capabilities specified in a configuration file 400 may be, for example, user-allowed capabilities 230 in configuration file 226 in FIG. 2. In this example, additional capabilities specified in a configuration file 400 are included in configuration file 402, which is a JSON configuration file corresponding to a container, such as container 208 in FIG. 2. Also in this example, additional capabilities specified in a configuration file 400 include additional capabilities 404. The user injects additional capabilities 404 into configuration file 400 to add new capabilities to an operating system kernel, such as, for example, operating system kernel 206 in FIG. 2.

Figure 5:
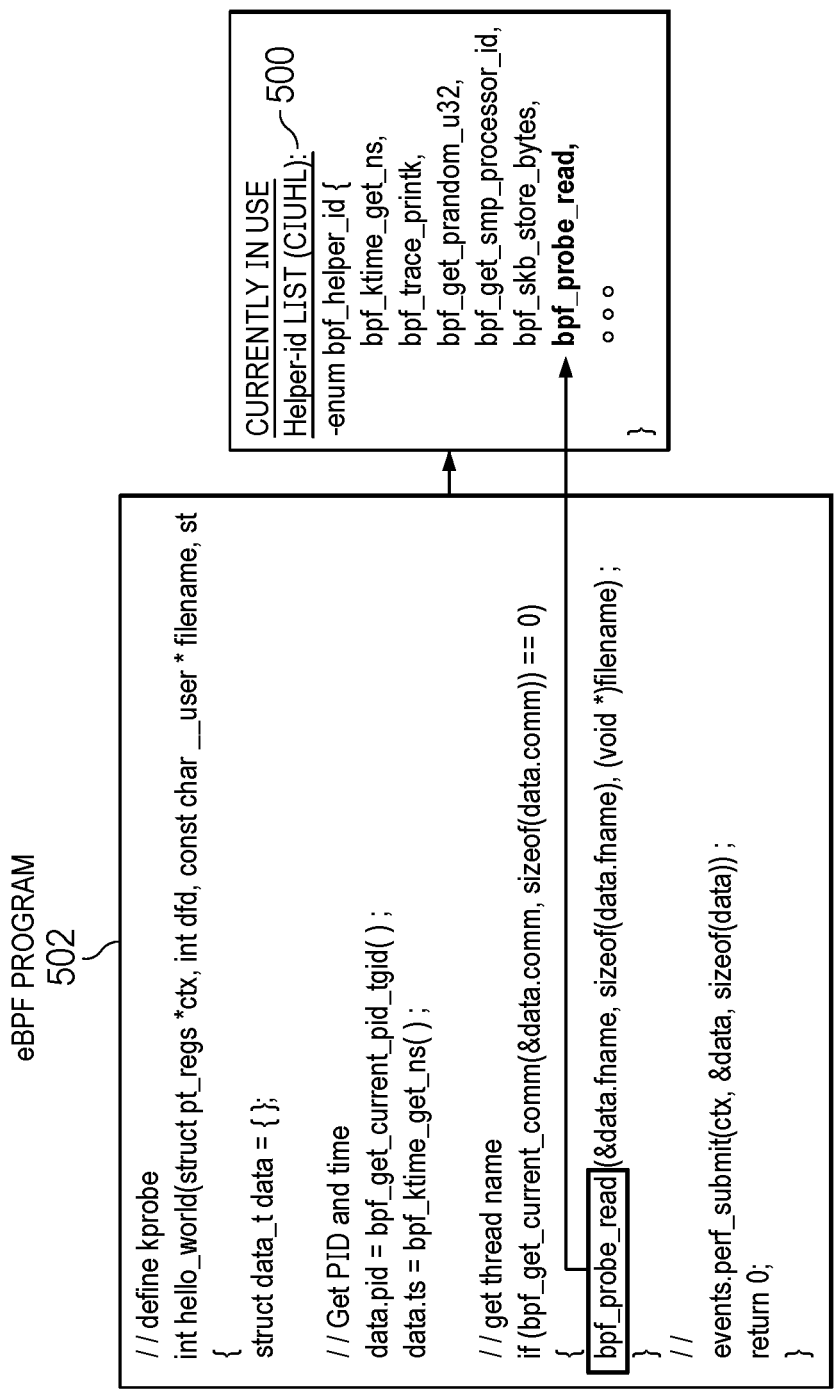
FIG. 5 is a diagram illustrating an example of a currently in use helper-id list in accordance with an illustrative embodiment.

With reference now to FIG. 5, a diagram illustrating an example of a currently in use helper-id list is depicted in accordance with an illustrative embodiment. Currently in use helper-id list 500 contains a list of called helper-ids in eBPF program 502, such as, for example, currently in use helper-ids 222 in eBPF program 212 in FIG. 2. Enhanced eBPF program bytecode, such as, for example, enhanced eBPF program bytecode 220 in FIG. 2, of the eBPF program generates currently in use helper-id list 500.

Figure 6:
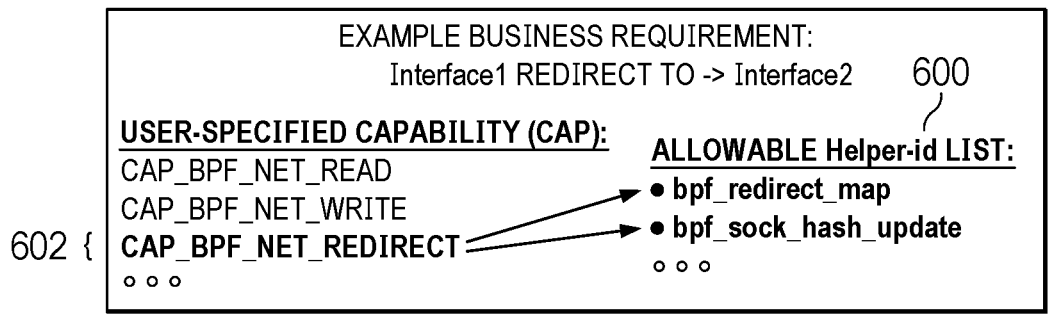
FIG. 6 is a diagram illustrating an example of an allowable helper-id list in accordance with an illustrative embodiment.

With reference now to FIG. 6, a diagram illustrating an example of an allowable helper-id list is depicted in accordance with an illustrative embodiment. Allowable helper-id list 600 may be, for example, allowable helper-id list 224 in FIG. 2. A runtime parser, such as, for example, runtime parser 210 in FIG. 2, generates allowable helper-id list 600 based on a runtime analysis of a configuration file, such as, for example, configuration file 226 in FIG. 2. In this example, allowable helper-id list 600 includes user-specified capability 602 for the example business requirement of redirecting interface 1 to interface 2.

Figure 7:
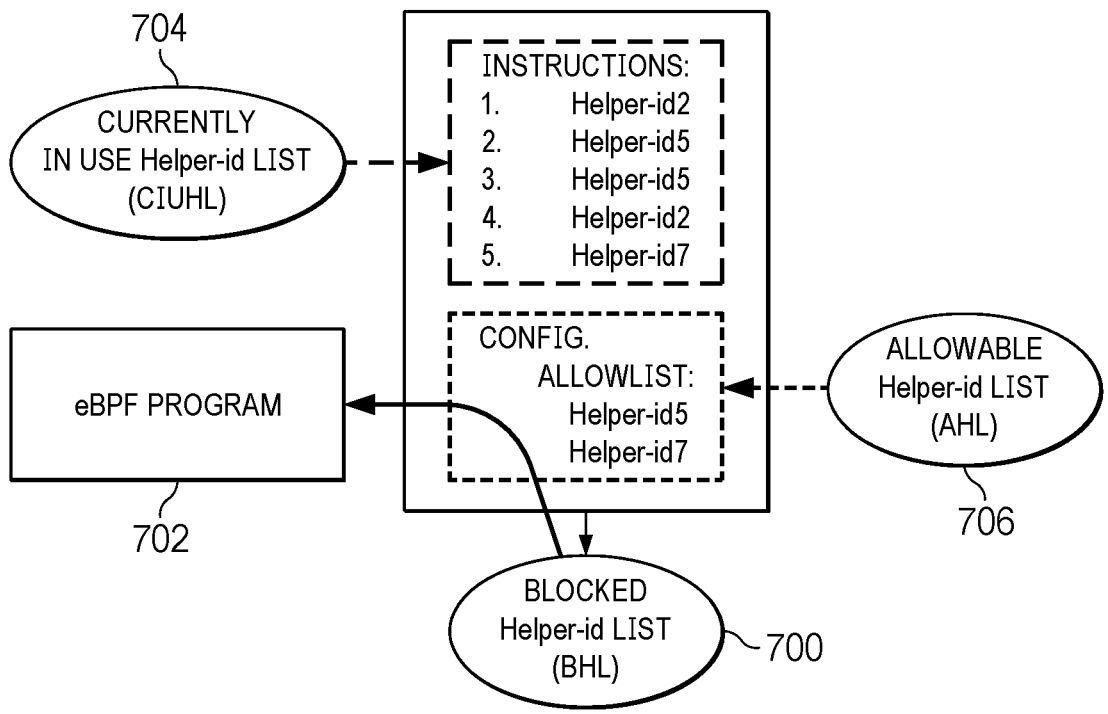
FIG. 7 is a diagram illustrating an example of a blocked helper-id list in accordance with an illustrative embodiment.

With reference now to FIG. 7, a diagram illustrating an example of a blocked helper-id list is depicted in accordance with an illustrative embodiment. Blocked helper-id list 700 contains a listing of all unallowable or invalid helper-ids corresponding to eBPF program 702, such as, for example, eBPF program 212 in FIG. 2. A verifier, such as, for example, verifier 238 in FIG. 2, generates blocked helper-id list 700 by comparing currently in use helper-id list 704 with allowable helper-id list 706 using a set of rules, such as, for example, helper-id comparison rules 244 in FIG. 2.

In this example, currently in use helper-id list 704 includes helper-id2, helper-id5, and helper-id7 and allowable helper-id list 706 includes helper-id5 and helper-id7. Based on the comparison, the verifier identifies helper-id2 as being an unallowable or invalid helper-id because helper-id2 is not found in allowable helper-id list 706 even though helper-id2 is found in currently in use helper-id list 704. As a result, the verifier includes helper-id2 in blocked helper-id list 700.

Figure 8B:
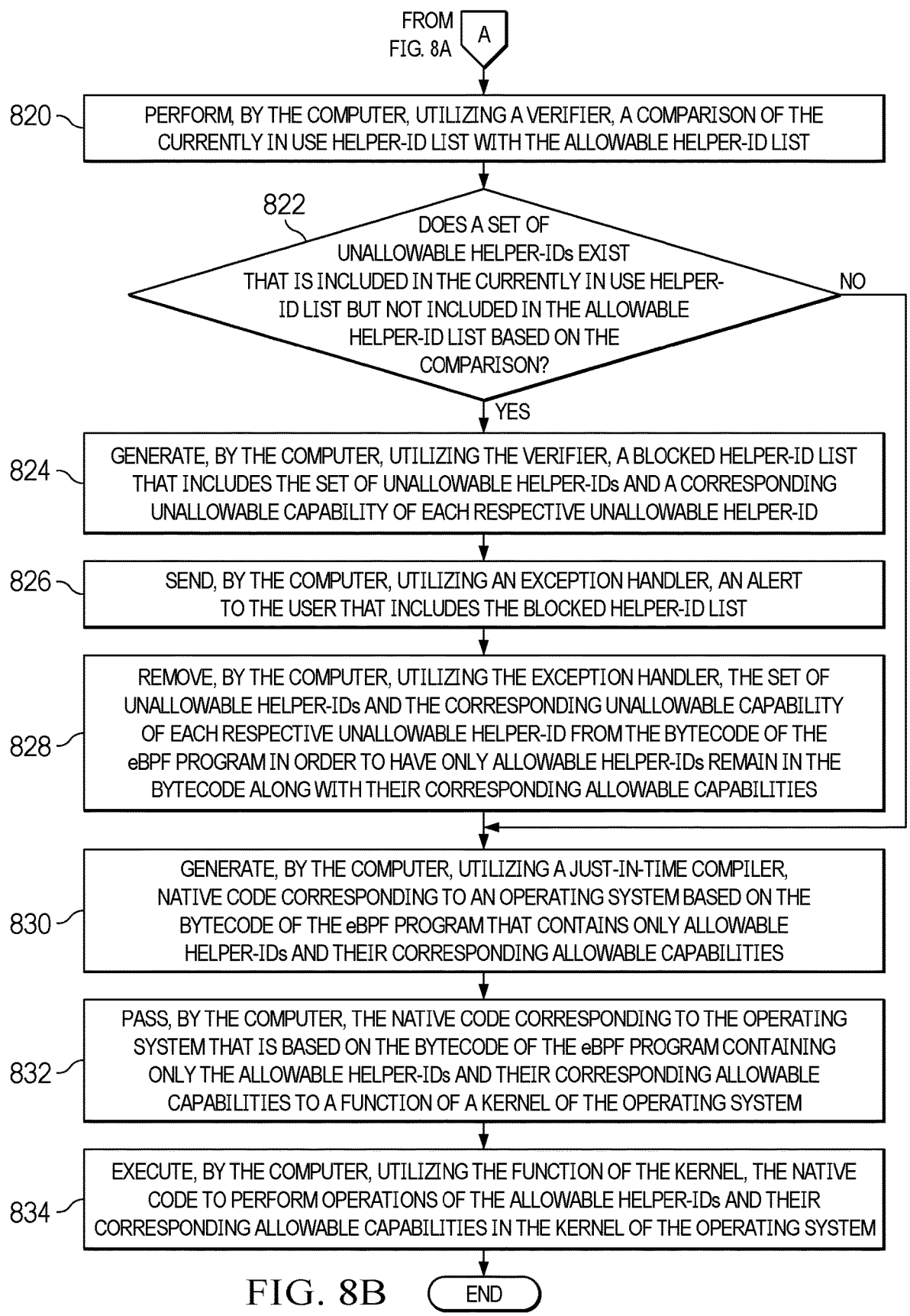

With reference now to FIGS. 8A-8B, a flowchart illustrating a process for selectively managing execution permissions of eBPF program capabilities is shown in accordance with an illustrative embodiment. The process shown in FIGS. 8A-8B may be implemented in a computer, such as, for example, computer 101 in FIG. 1 or computer 202 in FIG. 2. For example, the process shown in FIGS. 8A-8B may be implemented in eBPF program management code 200 in FIG. 1 or eBPF program manager 232 in FIG. 2.

The process begins when the computer receives an input from a user to run an eBPF program in a container of the computer (step 802). The eBPF program includes capabilities corresponding to currently in use helper-ids in the eBPF program. The computer may be, for example, a host node in a container orchestration environment, such as Kubernetes. However, Kubernetes is intended as an example only and not as a limitation on illustrative embodiments. In other words, the computer may be implemented in any type of container orchestration environment, architecture, or platform or any other type of computing environment such as a cloud, data center, or stand-alone computer.

In response to the computer receiving the input to run the eBPF program in step 802, the computer adds a new attribute to a compiler (step 804). The new attribute enhances bytecode of the eBPF program by adding a new helper-id field to the bytecode. In addition, the computer, utilizing the compiler having the new attribute added, adds the new helper-id field to the bytecode of the eBPF program (step 806).

Afterward, the computer runs the eBPF program in the container (step 808). The computer, utilizing the eBPF program having the new helper-id field added to the bytecode, identifies all called helper-ids in the eBPF program and a corresponding capability of each respective called helper-id (step 810). Further, the computer, utilizing the eBPF program having the new helper-id field added to the bytecode, generates a currently in use helper-id list that includes all the called helper-ids in the eBPF program and the corresponding capability of each respective called helper-id (step 812).

Furthermore, the computer retrieves a configuration file corresponding to the container running the eBPF program (step 814). The configuration file contains user-specified capabilities of the eBPF program. The computer, utilizing a runtime parser, performs a runtime analysis of the configuration file corresponding to the container running the eBPF program to identify the user-specified capabilities of the eBPF program and a corresponding helper-id of each respective user-specified capability (step 816). The computer, utilizing the runtime parser, generates an allowable helper-id list that includes the user-specified capabilities of the eBPF program and the corresponding helper-id of each respective user-specified capability based on the runtime analysis of the configuration file (step 818).

The computer, utilizing a verifier, performs a comparison of the currently in use helper-id list with the allowable helper-id list (step 820). The computer, utilizing the verifier, makes a determination as to whether a set of unallowable helper-ids exists that is included in the currently in use helper-id list but not included in the allowable helper-id list based on the comparison (step 822). If the computer, utilizing the verifier, determines that no unallowable helper-ids exist (i.e., all helper-ids in the currently in use helper-id list are included in the allowable helper-id list) based on the comparison, no output of step 822, then the process proceeds to step 830. If the computer, utilizing the verifier, determines that a set of unallowable helper-ids does exist that is included in the currently in use helper-id list but not included in the allowable helper-id list based on the comparison, yes output of step 822, then the computer, utilizing the verifier, generates a blocked helper-id list that includes the set of unallowable helper-ids and a corresponding unallowable capability of each respective unallowable helper-id (step 824).

The computer, utilizing an exception handler, sends an alert to the user that includes the blocked helper-id list (step 826). The computer, utilizing the exception handler, also removes the set of unallowable helper-ids and the corresponding unallowable capability of each respective unallowable helper-id from the bytecode of the eBPF program in order to have only allowable helper-ids remain in the bytecode along with their corresponding allowable capabilities (step 828).

Subsequently, the computer, utilizing a just-in-time compiler, generates native code corresponding to an operating system of the computer based on the bytecode of the eBPF program that contains only the allowable helper-ids and their corresponding allowable capabilities (step 830). The computer passes the native code corresponding to the operating system that is based on the bytecode of the eBPF program containing only the allowable helper-ids and their corresponding allowable capabilities to a function of a kernel of the operating system (step 832). The computer, utilizing the function of the kernel, executes the native code to perform operations of the allowable helper-ids and their corresponding allowable capabilities in the kernel of the operating system (step 834). Thereafter, the process terminates.

Thus, illustrative embodiments of the present invention provide a computer-implemented method, computer system, and computer program product for selectively controlling execution permissions of eBPF program capabilities in an operating system kernel to increase system security. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for managing execution of extended Berkeley Packet Filter (eBPF) program capabilities, the computer-implemented method comprising:
    performing, by a computer, a comparison of a currently in use helper-identifier (helper-id) list of an eBPF program with an allowable helper-id list of the eBPF program;
    determining, by the computer, whether a set of unallowable helper-ids of the eBPF program exists that is included in the currently in use helper-id list of the eBPF program but not included in the allowable helper-id list of the eBPF program based on the comparison;
    generating, by the computer, a blocked helper-id list of the eBPF program that includes the set of unallowable helper-ids of the eBPF program and a corresponding unallowable capability of each respective unallowable helper-id in response to the computer determining that the set of unallowable helper-ids of the eBPF program does exist; and
    removing, by the computer, the set of unallowable helper-ids and the corresponding unallowable capability of each respective unallowable helper-id from bytecode of the eBPF program in order to have only allowable helper-ids remain in the bytecode along with corresponding allowable capabilities of the eBPF program.

2. The computer-implemented method of claim 1, further comprising:
    sending, by the computer, an alert to a user that includes the blocked helper-id list.

3. The computer-implemented method of claim 1, further comprising:
    generating, by the computer, native code corresponding to an operating system of the computer based on the bytecode of the eBPF program that contains only the allowable helper-ids and the corresponding allowable capabilities;
    passing, by the computer, the native code corresponding to the operating system that is based on the bytecode of the eBPF program containing only the allowable helper-ids and the corresponding allowable capabilities to a function of a kernel of the operating system; and
    executing, by the computer, utilizing the function of the kernel, the native code to perform operations of the allowable helper-ids and the corresponding allowable capabilities in the kernel of the operating system.

4. The computer-implemented method of claim 1, further comprising:
receiving, by the computer, an input from a user to run the eBPF program in a container of the computer;
adding, by the computer, an attribute to a compiler of the computer, the attribute enhances the bytecode of the eBPF program by adding a helper-id field to the bytecode;
adding, by the computer, utilizing the compiler having the attribute added, the helper-id field to the bytecode of the eBPF program; and
running, by the computer, the eBPF program in the container.

5. The computer-implemented method of claim 4, further comprising:
identifying, by the computer, utilizing the eBPF program having the helper-id field added to the bytecode, called helper-ids in the eBPF program and a corresponding capability of each respective called helper-id; and
generating, by the computer, utilizing the eBPF program having the helper-id field added to the bytecode, the currently in use helper-id list that includes the called helper-ids in the eBPF program and the corresponding capability of each respective called helper-id.

6. The computer-implemented method of claim 4, further comprising:
retrieving, by the computer, a configuration file corresponding to the container running the eBPF program, the configuration file contains user-specified capabilities of the eBPF program;
performing, by the computer, a runtime analysis of the configuration file corresponding to the container running the eBPF program to identify the user-specified capabilities of the eBPF program and a corresponding helper-id of each respective user-specified capability; and
generating, by the computer, the allowable helper-id list that includes the user-specified capabilities of the eBPF program and the corresponding helper-id of each respective user-specified capability based on the runtime analysis of the configuration file.

7. The computer-implemented method of claim 1, further comprising:
rejecting, by the computer, those eBPF program capabilities corresponding to any blocked helper-id as an unallowable eBPF program capability to increase security.

8. A computer system for managing execution of extended Berkeley Packet Filter ("eBPF") program capabilities, the computer system comprising:
a communication fabric;
a storage device connected to the communication fabric, wherein the storage device stores program instructions; and
a processor connected to the communication fabric, wherein the processor executes the program instructions to:
perform a comparison of a currently in use helper-identifier (helper-id) list of an eBPF program with an allowable helper-id list of the eBPF program;
determine whether a set of unallowable helper-ids in the eBPF program exists that is included in the currently in use helper-id list of the eBPF program but not included in the allowable helper-id list of the eBPF program based on the comparison;
generate a blocked helper-id list of the eBPF program that includes the set of unallowable helper-ids of the eBPF program and a corresponding unallowable capability of each respective unallowable helper-id in response to determining that the set of unallowable helper-ids of the eBPF program does exist; and
remove the set of unallowable helper-ids and the corresponding unallowable capability of each respective unallowable helper-id from bytecode of the eBPF program in order to have only allowable helper-ids remain in the bytecode along with corresponding allowable capabilities of the eBPF program.

9. The computer system of claim 8, wherein the processor further executes the program instructions to:
send an alert to a user that includes the blocked helper-id list.

10. The computer system of claim 8, wherein the processor further executes the program instructions to:
generate native code corresponding to an operating system of the computer system based on the bytecode of the eBPF program that contains only the allowable helper-ids and the corresponding allowable capabilities;
pass the native code corresponding to the operating system that is based on the bytecode of the eBPF program containing only the allowable helper-ids and the corresponding allowable capabilities to a function of a kernel of the operating system; and
execute, utilizing the function of the kernel, the native code to perform operations of the allowable helper-ids and the corresponding allowable capabilities in the kernel of the operating system.

11. The computer system of claim 8, wherein the processor further executes the program instructions to:
receive an input from a user to run the eBPF program in a container of the computer system;
add an attribute to a compiler of the computer system, the attribute enhances the bytecode of the eBPF program by adding a helper-id field to the bytecode;
add, utilizing the compiler having the attribute added, the helper-id field to the bytecode of the eBPF program; and
run the eBPF program in the container.

12. The computer system of claim 11, wherein the processor further executes the program instructions to:
identify, utilizing the eBPF program having the helper-id field added to the bytecode, called helper-ids in the eBPF program and a corresponding capability of each respective called helper-id; and
generate, utilizing the eBPF program having the helper-id field added to the bytecode, the currently in use helper-id list that includes the called helper-ids in the eBPF program and the corresponding capability of each respective called helper-id.

13. The computer system of claim 11, wherein the processor further executes the program instructions to:
retrieve a configuration file corresponding to the container running the eBPF program, the configuration file contains user-specified capabilities of the eBPF program;
perform a runtime analysis of the configuration file corresponding to the container running the eBPF program to identify the user-specified capabilities of the eBPF program and a corresponding helper-id of each respective user-specified capability; and
generate the allowable helper-id list that includes the user-specified capabilities of the eBPF program and the corresponding helper-id of each respective user-specified capability based on the runtime analysis of the configuration file.

14. A computer program product for managing execution of extended Berkeley Packet Filter ("eBPF") program capabilities, the computer program product comprising a computer-readable storage medium having program instructions embodied therewith, the program instructions executable by a computer to cause the computer to perform a method of:
performing, by the computer, a comparison of a currently in use helper-identifier (helper-id) list of an eBPF program with an allowable helper-id list of the eBPF program;
determining, by the computer, whether a set of unallowable helper-ids of the eBPF program exists that is included in the currently in use helper-id list of the eBPF program but not included in the allowable helper-id list of the eBPF program based on the comparison;
generating, by the computer, a blocked helper-id list of the eBPF program that includes the set of unallowable helper-ids of the eBPF program and a corresponding unallowable capability of each respective unallowable helper-id in response to the computer determining that the set of unallowable helper-ids of the eBPF program does exist; and
removing, by the computer, the set of unallowable helper-ids and the corresponding unallowable capability of each respective unallowable helper-id from bytecode of the eBPF program in order to have only allowable helper-ids remain in the bytecode along with corresponding allowable capabilities of the eBPF program.

15. The computer program product of claim 14, further comprising:
sending, by the computer, an alert to a user that includes the blocked helper-id list.

16. The computer program product of claim 14, further comprising:
generating, by the computer, native code corresponding to an operating system of the computer based on the bytecode of the eBPF program that contains only the allowable helper-ids and the corresponding allowable capabilities;
passing, by the computer, the native code corresponding to the operating system that is based on the bytecode of the eBPF program containing only the allowable helper-ids and the corresponding allowable capabilities to a function of a kernel of the operating system; and
executing, by the computer, utilizing the function of the kernel, the native code to perform operations of the allowable helper-ids and the corresponding allowable capabilities in the kernel of the operating system.

17. The computer program product of claim 14, further comprising:
receiving, by the computer, an input from a user to run the eBPF program in a container of the computer;
adding, by the computer, an attribute to a compiler of the computer, the attribute enhances the bytecode of the eBPF program by adding a helper-id field to the bytecode;
adding, by the computer, utilizing the compiler having the attribute added, the helper-id field to the bytecode of the eBPF program; and
running, by the computer, the eBPF program in the container.

18. The computer program product of claim 17, further comprising:
identifying, by the computer, utilizing the eBPF program having the helper-id field added to the bytecode, called helper-ids in the eBPF program and a corresponding capability of each respective called helper-id; and
generating, by the computer, utilizing the eBPF program having the helper-id field added to the bytecode, the currently in use helper-id list that includes the called helper-ids in the eBPF program and the corresponding capability of each respective called helper-id.

19. The computer program product of claim 17, further comprising:
retrieving, by the computer, a configuration file corresponding to the container running the eBPF program, the configuration file contains user-specified capabilities of the eBPF program;
performing, by the computer, a runtime analysis of the configuration file corresponding to the container running the eBPF program to identify the user-specified capabilities of the eBPF program and a corresponding helper-id of each respective user-specified capability; and
generating, by the computer, the allowable helper-id list that includes the user-specified capabilities of the eBPF program and the corresponding helper-id of each respective user-specified capability based on the runtime analysis of the configuration file.

20. The computer program product of claim 14, further comprising:
rejecting, by the computer, those eBPF program capabilities corresponding to any blocked helper-id as an unallowable eBPF program capability to increase security.

* * * * *